United States Patent
Brehob

(10) Patent No.: US 7,363,911 B2
(45) Date of Patent: Apr. 29, 2008

(54) HUMIDITY-BASED COMBUSTION CONTROL IN A MULTIPLE COMBUSTION MODE ENGINE

(75) Inventor: Diana D. Brehob, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 96 days.

(21) Appl. No.: 11/266,893

(22) Filed: Nov. 3, 2005

(65) Prior Publication Data

US 2007/0095328 A1 May 3, 2007

(51) Int. Cl.
  F02P 5/15 (2006.01)
  F02M 51/00 (2006.01)
  F02M 25/07 (2006.01)
  F02D 41/04 (2006.01)
  F02B 33/44 (2006.01)

(52) U.S. Cl. ............... 123/406.47; 123/568.22; 123/494; 123/677; 60/602; 60/605.2

(58) Field of Classification Search ........... 123/294, 123/304, 434, 435, 494, 568.22, 677, 27 R, 123/27 GE; 701/101–105, 108; 73/29.01, 73/29.05; 60/605.2
See application file for complete search history.

(56) References Cited

U.S. PATENT DOCUMENTS

| | | | |
|---|---|---|---|
| 5,036,668 A | 8/1991 | Hardy | |
| 6,155,098 A * | 12/2000 | Shapiro et al. | ........... 73/29.01 |
| 6,230,683 B1 * | 5/2001 | zur Loye et al. | ........... 123/435 |
| 6,267,097 B1 | 7/2001 | Urushihara et al. | |
| 6,276,334 B1 * | 8/2001 | Flynn et al. | ........... 123/435 |
| 6,293,246 B1 | 9/2001 | Tanahashi et al. | |
| 6,295,973 B1 | 10/2001 | Yang | |
| 6,336,436 B1 | 1/2002 | Miyakubo et al. | |
| 6,390,054 B1 | 5/2002 | Yang | |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,915,776 B2 * | 7/2005 | zur Loye et al. | ........... 123/304 |
| 6,918,362 B2 * | 7/2005 | Cullen | ........... 123/90.15 |
| 6,923,167 B2 | 8/2005 | Flowers | |
| 6,932,175 B2 | 8/2005 | Teraji et al. | |
| 7,007,661 B2 * | 3/2006 | Warlick | ........... 123/27 GE |

(Continued)

OTHER PUBLICATIONS

O. Lang et al, "Thermodynamical and Mechanical Approach Towards a Variable Valve Train for the Controlled Auto Ignition Combustion Process," SAE Technical Paper No. Jan. 7, 2005, Apri. 11-14, 2005.

Primary Examiner—Willis R. Wolfe, Jr.
(74) Attorney, Agent, or Firm—Allan J. Lippa; Alleman Hall McCoy Russell & Tuttle LLP

(57) ABSTRACT

A system and method for controlling operation of a gasoline internal combustion engine capable of running in a spark ignition mode and a homogeneous charge compression ignition mode. The method and system implementation include determining humidity of air to be drawn into a combustion cylinder of the engine, and controlling an operating parameter of the engine that affects the homogeneous charge compression ignition mode of operation.

25 Claims, 3 Drawing Sheets

U.S. PATENT DOCUMENTS

| | | | |
|---|---|---|---|
| 7,178,503 B1 * | 2/2007 | Brehob | 123/304 |
| 2004/0065279 A1 | 4/2004 | Hitomi et al. | |
| 2004/0182359 A1 | 9/2004 | Stewart et al. | |
| 2005/0121008 A1 | 6/2005 | Kikenny et al. | |
| 2005/0173169 A1 | 8/2005 | Gray Jr. | |

* cited by examiner

HUMIDITY-BASED COMBUSTION CONTROL IN A MULTIPLE COMBUSTION MODE ENGINE

BACKGROUND AND SUMMARY

Homogeneous Charge Compression Ignition, or HCCI, combines certain aspects of spark ignition (SI) and diesel compression ignition combustion engines. Unlike a traditional SI or diesel engine, HCCI combustion takes place spontaneously and substantially homogeneously throughout the combustion chamber. As is the case with a compression ignition engine, HCCI may be a lean combustion process. These conditions translate to a lower local flame temperature which lowers the amount of Nitric Oxide (NO) and Nitrogen Dioxide ($NO_2$) ($NO+NO_2=NOx$) produced in the process.

In comparison to a spark ignition engine, the temperature of the intake charge during HCCI operation is often elevated at the beginning of the compression stroke to reach autoignition conditions at the end of the compression stroke. The inventor herein has recognized that the ambient humidity of air drawn into the engine during the intake stroke affects combustion temperature via dilution of the charge with material that cannot be oxidized and because the specific heat of water is higher than air. Thus, as humidity increases, to keep autoignition timing constant, requires a higher initial charge temperature. However, the inhibition of hydrocarbon autoignition by water addition is much greater than can be explained by the decrease in system temperature. Some researchers in the field theorize that water addition exerts chemical inhibition on hydrocarbon autoignition kinetics. Use of humidity sensing or estimation may thus enable improved adjustments to a plurality of engine operating parameters to aid in achieving or maintaining HCCI combustion, even when a vehicle may experience varying levels of ambient humidity.

DETAILED DESCRIPTION

Figure 1:
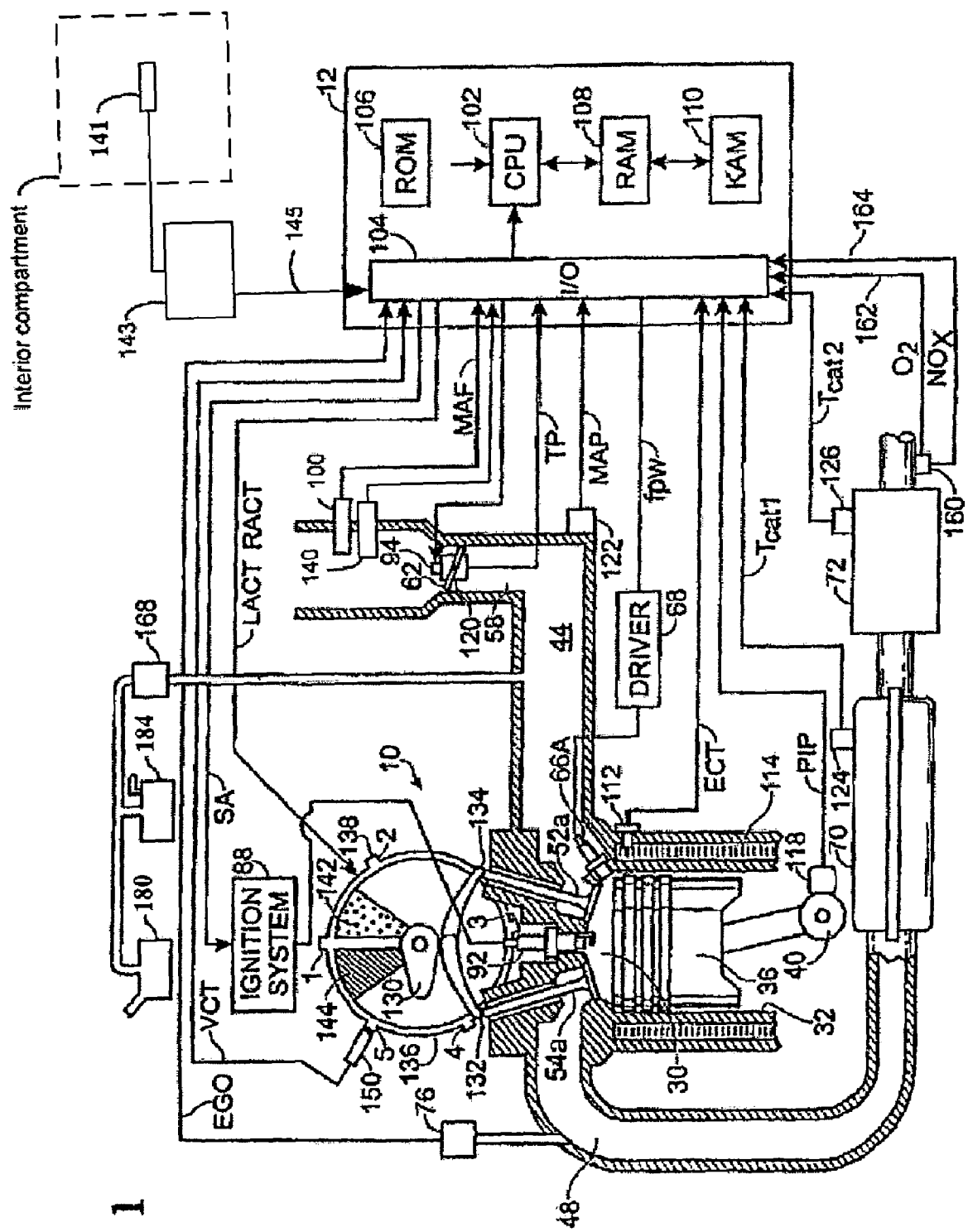
FIG. 1 shows a partial engine view.

FIG. 1 shows one cylinder of a multi-cylinder engine, as well as the intake and exhaust path connected to that cylinder. Continuing with FIG. 1, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. Note that sensor 76 corresponds to various different sensors, depending on the exhaust configuration as described below with regard to FIG. 1B. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Conventional distributorless ignition system 88 provides ignition spark to combustion chamber 30 via spark plug 92 in response to spark advance signal SA from controller 12. Though spark ignition components are shown, engine 10 (or a portion of the cylinders thereof) may be operated in a compression ignition mode, with or without spark assist, as explained in more detail below.

Controller 12 may be configured to cause combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous spark-ignition mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry.

The overall air/fuel ratio, when considering the combustion chamber as a whole, is lean when operating with a stratified air/fuel mixture. However, on a local level, air/fuel ratio varies from having no fuel to very rich pockets. An additional split mode of operation, wherein additional fuel is injected during the exhaust stroke while operating in the stratified mode, is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 180 and fuel vapor storage canister 184 via purge control valve 168, or during operating modes requiring more engine power, or during operation modes regulating temperature of the omission control devices such as catalyst 70 or NOx trap 72. It will be understood that various different types and configurations of emission control devices and purging systems may be employed.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position, TP, from throttle position sensor 120; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

The processed sensor output of sensor 160 may provide an indication of both oxygen concentration in the exhaust gas as well as NOx concentration. For example, signal 162 provides controller a voltage indicative of the $O_2$ concentration while signal 164 provides a voltage indicative of NOx concentration. Alternatively, sensor 160 can be a HEGO, UEGO, EGO, or other type of exhaust gas sensor. Also note that, as described above with regard to sensor 76, sensor 160 can correspond to various different sensors depending on the system configuration.

As described above, FIG. 1 merely shows one cylinder of a multi-cylinder engine, and that each cylinder has its own set of intake/exhaust valves, fuel injectors, spark plugs, etc. In an alternative embodiment, a port fuel injection configuration may be used where a fuel injector is coupled to intake manifold 44 in a port, rather than directly to cylinder 30.

It will be appreciated that the examples of FIGS. 1A and 1B are but two examples, and that many other engine configurations are possible. For example, instead of the cam mechanisms discussed above, intake and exhaust valves (e.g., intake valves 52a, 52b and exhaust valves 54a, 54b) may be actuated electromechanically or electrohydraulically.

Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically less than 0.35 a/f from stoichiometric; but can be greater under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used, if desired.

Humidity sensing may also be employed in connection with the depicted embodiments. For example, an absolute, or relative, humidity sensor 140 is shown for measuring humidity of the ambient air. This sensor can be located either in the inlet air stream entering manifold 44, or measuring ambient air flowing through the engine compartment of the vehicle. Further, in an alternative embodiment, a second humidity sensor (141) is shown which is located in the interior of the vehicle and coupled to a second controller 143 that communicates with controller 12 via line 145. The control processes described below herein can be located in controller 12, or controller 143, or a combination thereof. Further note that the interior humidity sensor can be used in a climate control system that controls the climate in the passenger compartment of the vehicle. Specifically, it can be used to control the air-conditioning system, and more specifically, whether to enable or disable the air-conditioning compressor clutch which couples the compressor to the engine to operate the compressor.

Also note that humidity may be estimated or inferred based on various operating parameters, such as barometric pressure. Alternatively, humidity can be inferred based on autoignition characteristics in via adaptive learning. Further, barometric pressure and adaptive learning can be used in combination, and may also be used with sensed humidity values.

As will be described in more detail below, combustion in engine 10 can be of various types/modes, depending on operating conditions. In one example, spark ignition (SI) can be employed where the engine utilizes a sparking device, such as spark plug coupled in the combustion chamber, to regulate the timing of combustion of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), where autoignition of combustion chamber gases occurs at a predetermined point after the compression stroke of the combustion cycle, or near top dead center of compression. Typically when HCCI combustion is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Further, fuel efficiency while operating in a compression combustion mode may be increased by reducing the engine pumping loss, increasing the gas specific heat ratio, and by utilizing a higher compression ratio.

In compression ignition operation mode, it will often be desirable to exercise close control over the timing of autoignition. The initial intake charge temperature directly affects the timing of autoignition. The start of ignition is not directly controlled by an event such as the injection of fuel in the standard diesel engine or the sparking of the spark plug in the spark ignited engine. Furthermore, the heat release rate is not controlled by either the rate and duration of the fuel-injection process, as in the diesel engine, or by the turbulent flame propagation time, as in the spark-ignited engine.

Note that autoignition is also a phenomena that may cause knock in a spark-ignited engine. Knock is undesirable in spark-ignited engines because it enhances heat transfer within the cylinder and may burn or damage the piston. In an HCCI engine, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically must be increased to reach auto-ignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbocharging and supercharging), changing the autoignition characteristics of the fuel provided to the engine, and heating the intake air charge (external EGR).

During HCCI combustion, autoignition of the combustion chamber gas is controlled to occur at a desired position of the piston to generate desired engine torque, and thus it may not be necessary to initiate a spark from a sparking mechanism to achieve combustion. However, a late timing of the spark plug, after an autoignition temperature should have been attained, may be utilized as a backup ignition source in the case that autoignition does not occur.

A third type of combustion that may be performed by engine 10 utilizes a sparking device to initiate (or assist) combustion when the temperature of the combustion chamber gas approaches an autoignition temperature (e.g., reaches a level substantially near autoignition without achieving combustion). Such a spark assist type of combustion can exhibit increased fuel efficiency and reduce NOx production over that of SI combustion, yet may operate in a higher torque range than compared with HCCI combustion. Spark assist may also offer an overall larger window for controlling temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on spark timing to provide the final energy needed to attain autoignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate autoignition of the remaining air/fuel mixture. Thus, a relatively small cloud of richer gases may be used that are proximate to the spark plug, which can also be homogeneous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved fuel economy and emissions. During periods of high engine torque requirements, spark assist may be activated to ensure proper combustion timing. As the engine is returned to a low or moderate torque requirement, the involvement of spark assist may cease in order to realize the full benefits of HCCI.

As noted above, ambient humidity of air drawn into the engine during the intake stroke may affect combustion temperature via dilution of the charge with material that cannot be oxidized and because the specific heat of water is higher than air. Thus, as humidity increases, to attain a desired autoignition timing, initial charge temperature should be adjusted in accordance with humidity levels. For example, use of humidity sensing or estimation may thus enable improved adjustments to a plurality of engine operating parameters to aid in achieving or maintaining HCCI combustion, even when a vehicle may experience varying levels of ambient humidity. Thus, increasing humidity may require higher initial temperatures and lower humidity may require lower initial temperature for a given autoignition timing at a given speed and torque.

The ambient humidity of air drawn into the engine during the intake stroke also affects peak combustion temperatures because it has a higher specific heat than air, the more common diluent. As the ambient humidity of the air drawn into the engine during the intake stroke increases, the peak combustion temperature is decreased via dilution of the charge with material that cannot be oxidized and subsequently raises the required initial charge temperature to attain efficient HCCI combustion.

The ambient or relative humidity can be determined using sensors 140 and/or 141 or may be inferred from other data and passed on to engine controller 12 to determine the ideal adjustments to engine control parameters for efficient operation. Note that a plurality of other parameters may affect both the peak combustion temperature and the required temperature for efficient HCCI combustion. These and any other applicable parameters may be accounted for in the routines embedded in engine controller 12 and may be used to determine optimum operating conditions. For example, as the octane rating of the fuel increases, the required peak compression temperature may increase as the fuel requires a higher peak compression temperature to achieve ignition. Also, the level of charge dilution may be affected by a variety of factors including both humidity and the amount of exhaust gases present in the intake charge. In this way, it is possible to adjust engine parameters to compensate for the effect of humidity variation on autoignition, i.e., the effect of water makes autoignition less likely.

Figure 2:
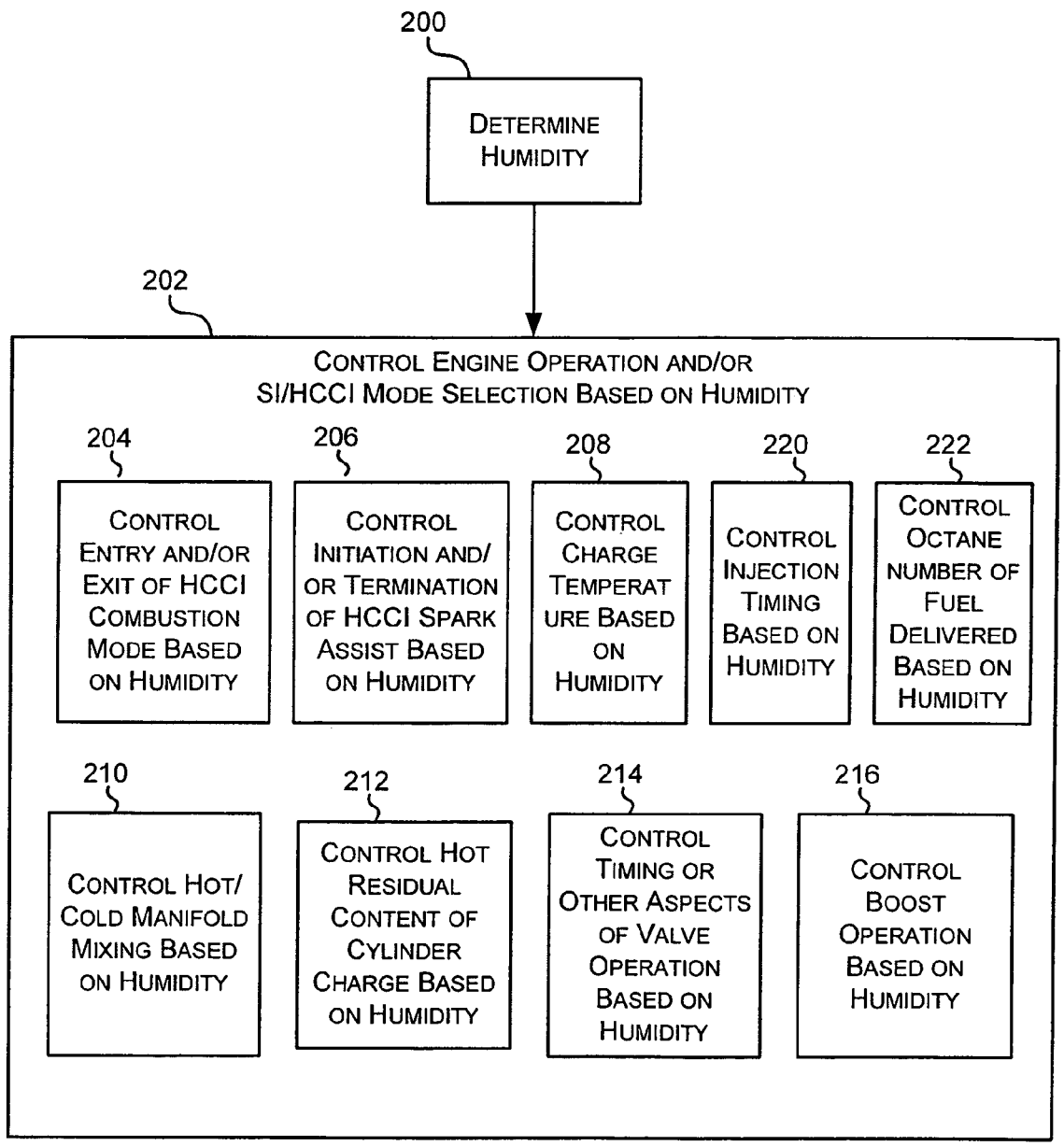
FIGS. 2 and 3 depict exemplary methods of operating an internal combustion engine, in which humidity sensing is employed to aid in controlling combustion.
Figure 3:
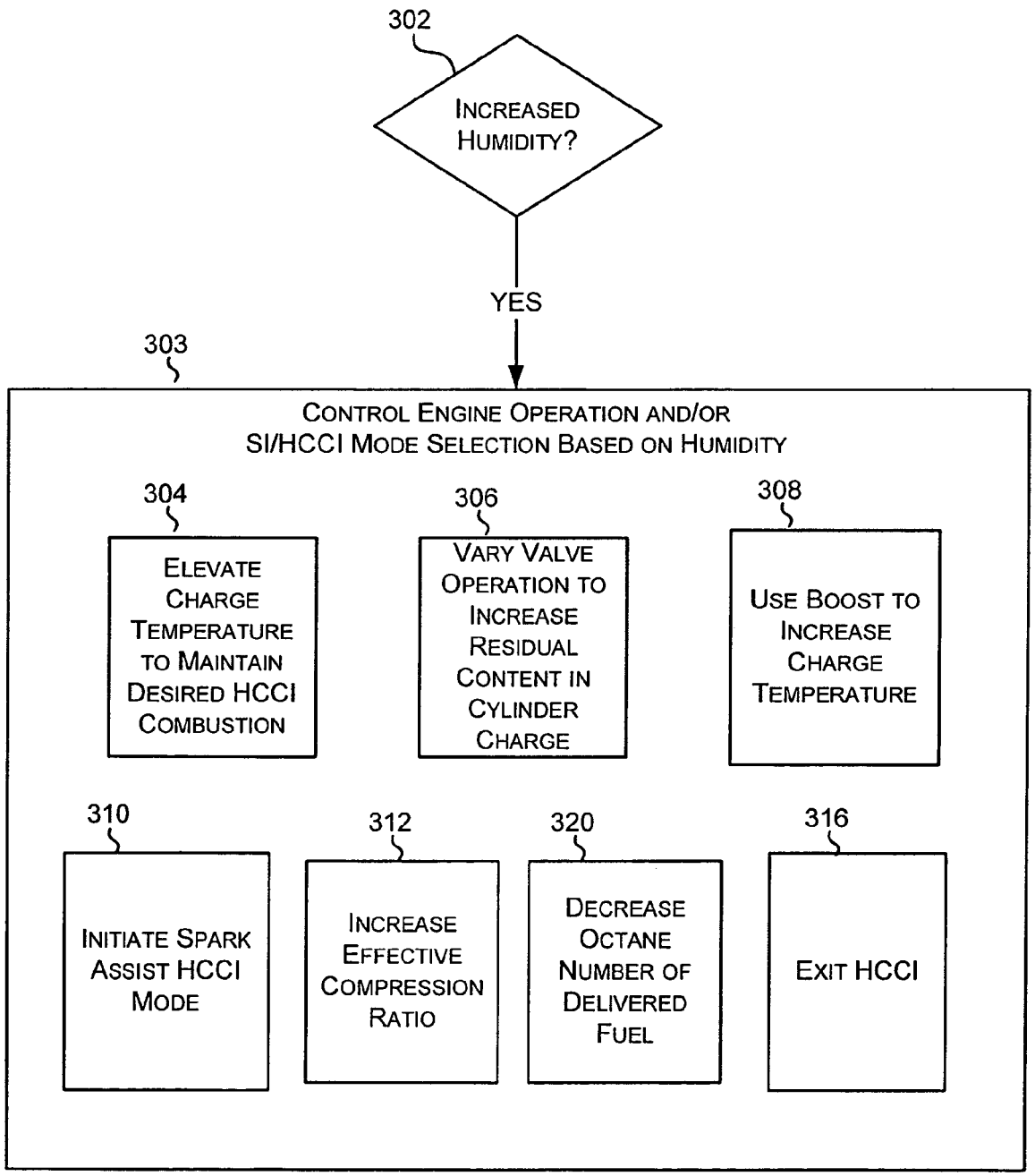

FIGS. 2-3 depict exemplary methods of operating an internal combustion engine, in which humidity sensing is employed to aid in controlling engine operation to achieve or maintain a desired combustion mode, typically HCCI. The depicted exemplary method implementations may be employed in connection with any of the engine embodiments depicted or described herein. For example, the ambient humidity may be used to determine whether to change operating modes, as well as to determine desired engine parameter settings in any or each operating mode.

Referring first to FIG. 2, one possible method implementation is shown. In the depicted method, humidity sensing may be employed (e.g., via humidity sensor 140 and/or 141) to determine the humidity of the ambient air entering the intake manifold 44. The sensed humidity may then be employed in control schemes (e.g., run by controller 12) to control one or more engine operating parameters and thereby achieve control over the different available combustion modes. Typically, humidity information will be used to aid in initiating a transition to HCCI operation from another combustion mode, and/or to maintain stable HCCI operation.

Continuing with FIG. 2, at step 200 the ambient or relative humidity is determined using humidity sensors 140 and/or 141. At step 202, engine parameters are controlled and/or combustion modes are selected based on the sensed humidity. Current operating conditions may be assessed (using the humidity information and other data), and determinations may be made about whether to remain in a current combustion mode or to initiate a mode transition, for example from SI to HCCI, or from HCCI to HCCI with spark assist. Controlled engine parameters may include, for example, (1) the valve timing for controlling hot residual exhaust gases remaining in the combustion chamber, (2) the air to fuel ratio (a/f), (3) the hot and cold valve mix ratio from respective hot and cold intake manifolds, where the hot intake manifold is heated by a heat exchanger or other method, (4) the octane level of the fuel, (5) the temperature of the intake gases, (6) the current mode of engine operation (SI, HCCI, HCCI with spark assist), (7) the effective compression ratio required (affected by valve timing), (8) and the compression of intake gases via turbo-charging or supercharging as may be controlled typically by a clutching or declutching in regards to a supercharger and by controlling a waste gate or a variable nozzle on a turbo-charger.

As shown at 204, the current humidity level may be used to determine the desired combustion mode. In one example where a high level of humidity is present in the intake charge air, the peak charge temperature during combustion will be decreased as compared to during a low humidity condition. Subsequently, the transition to HCCI combustion may be delayed to compensate for the humidity effect until the intake charge temperature can be increased to a level within the desired range for robust combustion. Conversely, if the engine is already operating in HCCI mode, it may be desirable to transition to SI mode. This may occur when a rapid change in humidity is detected. For example, a transition from HCCI to SI may be performed at mid-torque levels as the HCCI autoignition may become too harsh and generate noise, vibration, and or harshness (NVH) issues (e.g., the rate of pressure rise in cylinder may be too high). Near the transition point, measures may be taken to lessen the strength of the autoignition, such as reducing charge temperature, increasing diluent, etc. Thus, if humidity increases, the controller may delay the torque transition level at which the engine transitions from HCCI to SI combustion, for example. That is, the higher humidity reduces the autoignition tendency and so enables continued operation in HCCI without increased NVH. This can improve thermal efficiency by increasing operation in HCCI.

Another transition which may be affected by humidity relates to cold start or low torque level operation. For example, if SI combustion is used under such condition, then as the humidity increases, this may delay the transition to HCCI operation since it may take longer to heat intake air, etc. (as the engine temperature and/or exhaust may be cooler than warmed-up operating temperatures).

From the above example, it should be appreciated that the humidity-based control schemes are applicable whether or not humidity levels are changing rapidly during engine operation. Indeed, humidity typically may change relatively slowly compared with engine transient response to driver requests, for example. Nevertheless, the sensed humidity may be employed to set control conditions for operation of the engine; For example, in combustion mode selection, boundary conditions and transition criteria may be based on the sensed humidity, such that timing or other aspects of mode transitions will be humidity dependent.

At 206, the method may include use of humidity information to control spark assist modes of HCCI operation. Spark assist may offer an overall larger window for controlling temperature at a specified timing in the engine cycle, as spark assisted combustion may be performed under conditions where non-spark assisted HCCI combustion may not be. Therefore, if the charge temperature is too low for robust HCCI combustion, the transitional spark assist may allow control of the desired ignition timing during a high humidity condition as outlined in the example above. By burning a small amount of the fuel-air mixture under spark control, the unburned gases are compressed due to the compression heating of the flame front. Thus, the bulk gases will burn, that might not have autoignited without such spark ignited combustion. In the spark assist mode, it is possible to attain many of the benefits of HCCI combustion, but to rely on spark timing to provide the final compression heating needed to attain autoignition and thus more precisely control the timing of combustion. Such a spark assist type of combustion can exhibit increased fuel efficiency and reduce NOx production over that of SI combustion. Without the use of spark assistance, a relatively high level of humidity might require an earlier transition to SI combustion and a subsequent loss of efficiency.

Continuing with the example of a detected high humidity condition, at 208, the method may include determining that elevating the charge temperature will allow operation in the desired combustion mode with or without changing modes or adjusting other engine operating parameters. This can be done using a plurality of methods. One may involve a method using a recuperative type heat exchanger to preheat the intake air charge and subsequently raise the peak combustion temperature. At 210, temperature control over dual intake manifolds may be employed, by controlling the mixing of hot and cold intake air supplies based on sensed humidity. Again, as previously explained, humidity data may be employed and will typically be a factor in control schemes even where humidity is not dynamically changing during engine operation. In the present example, the mixing of hot and cold air supplies for a given set of conditions is humidity dependent, even where dynamic control is not affected based on humidity.

Steps 212 and 214 comprise an alternate method of exercising control over operating parameters based on humidity. As shown at 212, valve operation for one or more combustion cylinders may be controlled based on humidity. For example, cam timing, cam-profile switching or EVA control may be employed using humidity as a control parameter. For example, at a relatively high humidity level, a higher temperature for intake air would be required to initiate and maintain HCCI combustion. This humidity effect could be compensated for by changing valve operation to increase the hot residuals being pulled into the cylinder from the exhaust manifold during the intake stroke of the piston. This method may be optimized to exercise desired control over charge temperature as the piston approaches TDC compression.

It should be appreciated that humidity may be used to control valve operation in a variety of different engine settings, and in various different valve configurations. In addition to changing cam timing in an overhead cam system, intake or exhaust valve lift may be controlled (e.g., via EVA), intake or exhaust valve cam timing may be controlled, timing of dual equal cams may be controlled, etc.

Ambient humidity also causes dilution of the engine cylinder charge mixture. Thus if the VCT timing was optimized for low humidity, resulting in being right on the edge of efficient HCCI operation, the reduced peak combustion temperature present in a high humidity condition would result in inefficient HCCI operation. To avoid this, engines are typically calibrated with the VCT timing schedule for a worst case high humidity day. Therefore a humidity sensor, such as an internal or ambient humidity sensor, can be used as described herein. Specifically, if the VCT timing schedule is adjusted for humidity, then the optimal timing for efficient HCCI combustion can be delivered at a variety of humidity levels.

Continuing with FIG. 2, as shown at 216, boost operation may also be controlled based on humidity levels, and/or by taking humidity levels into account. Raising intake charge temperature during operation in a high humidity condition may include compressing the intake air and or air/fuel mixture before entering the cylinder via turbo-charging and/or supercharging. Compressing the intake charge in the fixed volume of the intake manifold results in an increase in both pressure and subsequently, temperature. This may allow the charge temperature to be within the desired window for desired HCCI combustion.

Note that if engine 10 includes adjustable boosting (e.g., from a variable geometry turbocharger, clutched supercharger, wastegate, etc.), the boost may be adjusted to adjust charge temperature if other parameter adjustments have been exhausted. For example, the peak combustion temperature may be decreased during a low humidity condition. It will be appreciated by those skilled in the art that numerous other methods utilizing a turbo-charger or supercharger could be employed.

Routine 218 embodies another method of raising the intake charge temperature which may comprise of diverting hot exhaust gases into one or more cylinders, typically called external EGR (Exhaust Gas Re-circulation), and subsequently raising the temperature of the intake charge to the level required to enter into HCCI operation. For example, external EGR may be used, under some conditions, to adjust charge temperature. Typically, engine 10 may operate with some level of EGR at all times. Therefore, by adjusting the amount of diverted hot gases into the intake manifold as compared to normal operating conditions, a reduction or increase in peak combustion temperature may be realized during a low or high humidity conditions, respectively, allowing robust HCCI operation. It will be appreciated by those skilled in the art that numerous other methods utilizing external EGR could be utilized.

Continuing with FIG. 2, as shown at 220, injection timing may be adjusted in response to humidity and/or other operating parameters. For example, some HCCI techniques do not use fully premixed charge, but have some degree of stratification that is influenced by injection timing. Further, injection timing may affect fuel autoignition characteristics. As such, injection timing may be varied in response to humidity variations for a given operating condition.

As another example, one HCCI approach includes using two fuels, one that autoignites more easily than another (e.g., low and high octane number fuels), where autoignition timing is controlled by varying the proportions of the fuels as in 222. As such, in one approach, the relative amount of fuel injection between different fuels may be adjusted to vary an octane number of a total fuel charge in response to varying humidity levels to control autoignition timing.

Referring now to FIG. 3, another method implementation is depicted. At 302, the method includes determining whether a relatively high humidity condition exists. This may be determined for example, by assessing whether humidity has exceeded a threshold, whether a specified increase has occurred over a reference level, etc. If such a condition exists, mode selection and/or engine control parameters may be appropriately adjusted (at 303). For example, at 304, charge temperature may be elevated to achieve or maintain HCCI combustion. At 306, valve operation may be adjusted, or controlled or varied, to increase the hot residuals pulled into the combustion cylinder, so as to elevate charge temperatures to achieve or maintain HCCI operation. Boost may be employed, at 308, to elevate charge temperature. The increased humidity may be employed, at 310, in determining to initiate spark assist while in HCCI operation. Effective compression ratio may be increased in response to elevated humidity, as shown at 312; or high humidity levels may be factored into mode exit/entry control (at 316). Further, octane of a fuel or fuel blend may be changed (e.g., decreased) in response to increased humidity, as shown at 320.

Note that the above adjustments may be used alone or in combination. Further, different adjustments may be made depending on the operating conditions, such as temperature, speed, load, etc. For example, under a first condition, a controller may adjust valve timing and/or fuel injection timing in response to humidity changes, while under a second condition, the controller may adjust fuel octane levels and/or boosting levels in response to humidity changes. Further still, different actions may be taken depending on the humidity level, or the degree of humidity level changes.

It will be appreciated that mode selection and/or control of engine parameters may also be controlled in response to detection of a relatively low humidity level or condition. Valve operation may be modified (e.g., to decrease residual content), boosting may be adjusted in response to the low humidity condition, initiation or exit of HCCI or HCCI with spark assist modes may be controlled with the low humidity condition as a factor, etc.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an internal combustion engine, comprising:
   sensing ambient humidity;
   adjusting a cylinder valve operation of a combustion cylinder of the engine as ambient humidity changes to maintain a desired autoignition timing for homogeneous charge compression ignition, said cylinder valve adjusting including increasing hot residual content of intake charges when humidity is increased, and decreasing hot residual content of intake charges when humidity is decreased;
   injecting gasoline into the combustion cylinder of the internal combustion engine; and
   operating the combustion cylinder in a homogeneous charge compression ignition combustion mode.

2. A method of operating an internal combustion engine, comprising:
   sensing ambient humidity;
   adjusting an operating parameter of the engine in response to ambient humidity changes to maintain a desired autoignition timing.

3. The method of claim 2 wherein said adjusting includes adjusting an initial charge temperature to achieve autoignition.

4. The method of claim 3 wherein said desired autoignition timing is varied with engine speed or engine torque.

5. The method of claim 2 where said adustin includes varying cylinder valve operation to increase hot residual content of intake charges when the sensor indicates an increase in humidity.

6. A method of operating an internal combustion engine, comprising:
   during a first level of humidity, operating with an operating parameter of the engine that affects charge temperature in a first range to achieve homogenous charge compression ignition combustion; and
   during a second level of humidity, operating with said operating parameter of the engine in a second range to achieve homogenous charge compression ignition combustion.

7. The method of claim 6, where the operating parameter is intake valve timing for a combustion cylinder.

8. The method of claim 6, where the operating parameter is exhaust valve timing for a combustion cylinder.

9. The method of claim 6, where the operating parameter controls mixing of air from hot and cool intake air sources in an air intake pathway upstream of a combustion cylinder of the internal combustion engine.

10. The method of claim 6, where the operating parameter is an effective compression ratio of a combustion cylinder of the internal combustion engine.

11. A method of controlling an internal combustion engine, comprising:
   determining humidity of air provided to a combustion cylinder of the engine;
   adjusting an engine operating parameter based on said humidity wherein said engine operating parameter affects autoignition of the fuel and air charge, and where said adjusting includes varying operation of a turbocharger or supercharger of the engine based on sensed humidity.

12. The method of claim 11, where determining humidity is performed via operation of a humidity sensor coupled to a vehicle having the engine.

13. The method of claim 11, where said adjusting further includes varying an octane of the fuel.

14. The method of claim 11, where said adjusting further includes varying cylinder valve operation to increase hot residual content of intake charges when the sensor detects an increase in humidity.

15. The method of claim 1, wherein the air includes induction air from ambient.

16. The method of claim 11, where said adjusting further includes varying valve operation of a combustion cylinder based on sensed humidity.

17. The method of claim 16, where varying the valve operation includes varying the valve operation so as to vary hot residual content of intake charges within the combustion cylinder.

18. An internal combustion engine, comprising:
   a combustion cylinder;
   an electronic engine controller configured to selectively operate the cylinder in each of a spark ignition mode and in a compression ignition mode based on operating conditions; and
   a sensor operatively coupled with the electronic engine controller; where the sensor and electronic engine controller are configured to determine humidity of air to be drawn into the combustion cylinder,
   where the electronic engine controller is configured to control one or more combustion mode parameters of the internal combustion engine based on sensed humidity, where said controller varies cylinder valve operation in the compression ignition mode to increase hot residual content of intake charges when humidity is increased, and to decrease hot residual content of intake charges when humidity is decreased.

19. The engine of claim 18, where the combustion cylinder is further configured to be operated in a spark assist compression ignition mode, and where the electronic engine controller is configured to control initiation and termination of the spark assist compression ignition mode based on the sensed humidity.

20. The engine of claim 18, where the one or more combustion mode parameters include operation of an intake valve and an exhaust valve of the combustion cylinder.

21. The engine of claim 18, where the one or more combustion mode parameters include temperature of intake charges for the combustion cylinder.

22. The engine of claim 18, where the one or more combustion mode parameters include operation of a turbocharger or supercharger of the engine.

23. The engine of claim 18, where the one or more combustion mode parameters include an effective compression ratio of the combustion cylinder.

24. The engine of claim 18, where the sensor is located in an air intake pathway of the combustion cylinder.

25. The engine of claim 18, where the sensor is located in a cabin of a vehicle in which the engine is disposed.

* * * * *